US006957120B1

(12) United States Patent
Bode et al.

(10) Patent No.: US 6,957,120 B1
(45) Date of Patent: Oct. 18, 2005

(54) MULTI-LEVEL PROCESS DATA REPRESENTATION

(75) Inventors: Christopher A. Bode, Austin, TX (US); Michael L. Miller, Chicago, IL (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 10/336,890

(22) Filed: Jan. 6, 2003

(51) Int. Cl.[7] ............................................. G06F 19/00

(52) U.S. Cl. .................. 700/121; 700/95; 700/117; 438/14; 702/127

(58) Field of Search ........................ 700/90, 95, 108, 700/117, 121; 438/4, 5; 702/127, 182, 183

(56) References Cited

U.S. PATENT DOCUMENTS

| | | | | |
|---|---|---|---|---|
| 4,840,495 | A | * | 6/1989 | Bonnefoy ..................... 374/43 |
| 6,177,680 | B1 | * | 1/2001 | Dick et al. ............. 250/492.22 |
| 6,230,069 | B1 | * | 5/2001 | Campbell et al. ........... 700/121 |
| 6,263,255 | B1 | * | 7/2001 | Tan et al. ................... 700/121 |
| 6,298,470 | B1 | * | 10/2001 | Breiner et al. ................. 716/4 |
| 6,304,999 | B1 | * | 10/2001 | Toprac et al. .................. 716/4 |
| 6,664,546 | B1 | * | 12/2003 | McCord et al. ............. 250/397 |

* cited by examiner

Primary Examiner—Jayprakash N. Gandhi
(74) Attorney, Agent, or Firm—Williams Morgan & Amerson, P.C.

(57) ABSTRACT

A method and an apparatus for implementing enhancing data population based upon manufacturing data. A first and a second workpiece are processed. Metrology data relating to the first workpiece is acquired. The metrology data is extrapolated to generate representative metrology data relating to the second workpiece.

38 Claims, 7 Drawing Sheets

MULTI-LEVEL PROCESS DATA REPRESENTATION

BACKGROUND OF THE INVENTION

1. Field of the Invention

This invention relates generally to semiconductor manufacturing, and, more particularly, to a method and apparatus for enhancing population of process data based upon acquired manufacturing data.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on approximately one to four die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Turning now to FIG. 2, a typical flow of processes performed on a semiconductor wafer 105 by a semiconductor manufacturing system is illustrated. A manufacturing system processes semiconductor wafers 105 associated with a batch/lot (block 210). The manufacturing system then acquires metrology data from selected semiconductor wafers 105 based upon a predetermined sample rate (block 220). In other words, based upon a predetermined sampling scheme, a few of the processed semiconductor wafers 105 are examined for metrology data acquisition. The metrology data is then analyzed to determine process errors (block 230). A subsequent process is then performed using corrections or modifications that are based on analysis of the metrology data (block 240).

Since acquisition of metrology data is generally based upon predetermined sampling rates, changes in processes may cause predetermined sampling rates to be inadequate. Among the problems associated with the current methodologies include the fact that because the sampling protocol for acquiring metrology data is preset, there may be a lack of accurate data that reflects the overall metrology analysis of processed semiconductor wafers 105.

Generally, employing current methodology may result in inadequate metrology data because of the implementation of a predetermined sampling rate, which is generally determined using factors such as cost reduction and efficiency of processing. Additionally, the acquired metrology data generally may not be organized in a fashion such that an appropriate amount of sampled metrology data is available for evaluating appropriate process steps. For example, some processes call for additional data compared to that acquired from sampled semiconductor wafers 105. Conversely, other processes may call for less data or data structured in a different fashion, which may be more coarse than the actual sampling rate used to sample processed semiconductor wafers 105. When there is a lack of adequate metrology data or when there is a case where there is too much data available for efficient analysis, the accuracy of analysis of metrology data and process corrections may be compromised.

The present invention is directed to overcoming, or at least reducing, the effects of, one or more of the problems set forth above.

SUMMARY OF THE INVENTION

In one aspect of the present invention, a method is provided for enhancing data population based upon manufacturing data. A first and a second workpiece are processed. Metrology data relating to the first workpiece is acquired. The metrology data is extrapolated to generate representative metrology data relating to the second workpiece.

In another aspect of the present invention, a method is provided for enhancing data population based upon manufacturing data. A plurality of workpieces associated with a batch is processed. Metrology data relating at least one workpiece is acquired based upon a sample rate. The metrology data is extrapolated to generate representative metrology data relating to at least one non-sampled workpiece associated with the batch.

In yet another aspect of the present invention, a method is provided for enhancing data population based upon manufacturing data. A plurality of workpieces associated with a batch is processed. A plurality of the workpieces is sampled for acquiring metrology data relating sampled workpieces based upon a sample rate. At least one of an extrapolation process and an interpolation process upon the metrology data is performed. The extrapolation process includes extrapolating the metrology data to generate representative metrology data relating to at least one non-sampled workpiece associated with the batch. The interpolation process includes interpolating the metrology data relating to the sampled workpieces for contracting the metrology data.

In another aspect of the present invention, a system is provided for enhancing data population based upon manufacturing data. The system includes a processing tool to process a first and a second workpiece. The system also includes a metrology tool to acquire metrology data relating to the first workpiece. The system also comprises a controller to perform an extrapolation process and/or an interpolation process upon the metrology data. The extrapolation process includes extrapolating the metrology data relating to the first workpiece to generate representative metrology data relating to the second workpiece. The interpolation process comprising interpolating the metrology data relating to the first workpiece to contract the metrology data.

In another aspect of the present invention, an apparatus is provided for enhancing data population based upon manufacturing data. The apparatus includes a controller to perform an extrapolation process and/or an interpolation process upon metrology data acquired from a sampled processed workpiece. The extrapolation process includes extrapolating the metrology data relating to the sampled workpiece to generate representative metrology data relating to a non-sampled workpiece. The interpolation process includes interpolating the metrology data relating to the sampled workpiece to contract the metrology data.

In yet another aspect of the present invention, a computer readable program storage device encoded with instructions is provided for enhancing data population based upon manufacturing data. The computer readable program storage device encoded with instructions that, when executed by a computer, performs a method, which comprises: processing a first and a second workpiece; acquiring metrology data relating to the first workpiece; and extrapolating the metrology data to generate representative metrology data relating to the second workpiece.

BRIEF DESCRIPTION OF THE DRAWINGS

The invention may be understood by reference to the following description taken in conjunction with the accompanying drawings, in which like reference numerals identify like elements, and in which.

Figure 1:
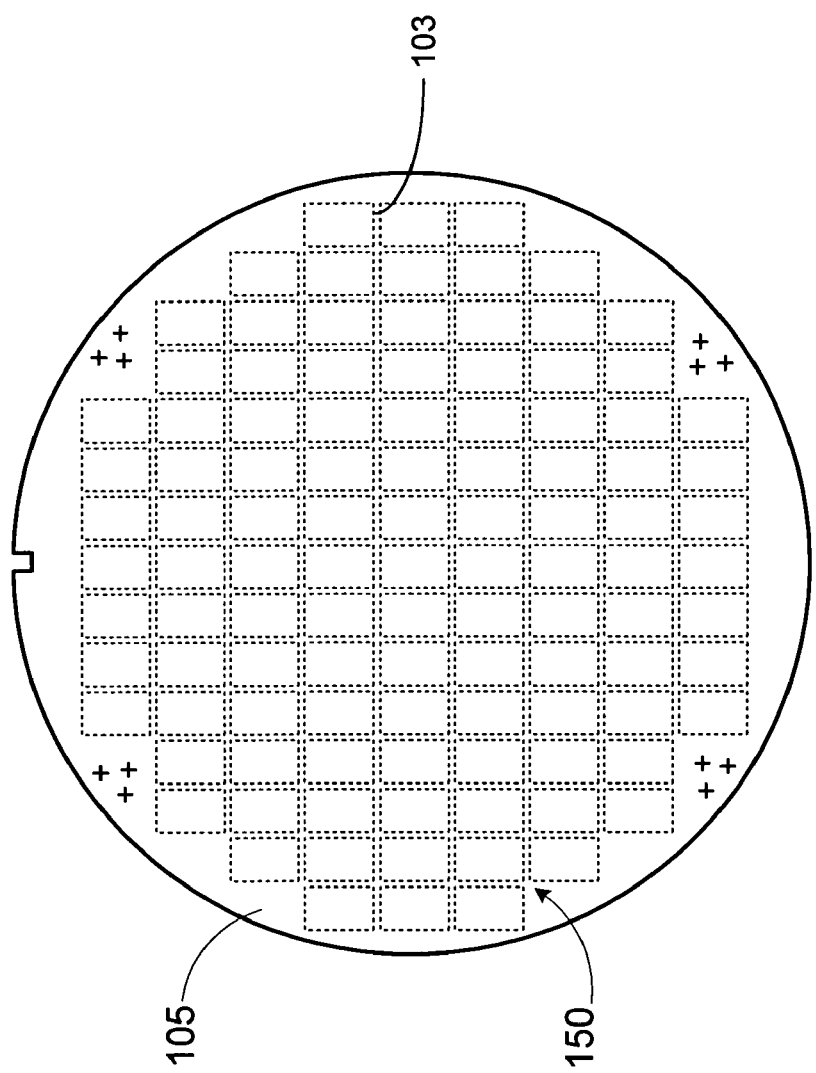
FIG. 1 is a simplified diagram of a prior art semiconductor wafer being processed.
Figure 2:
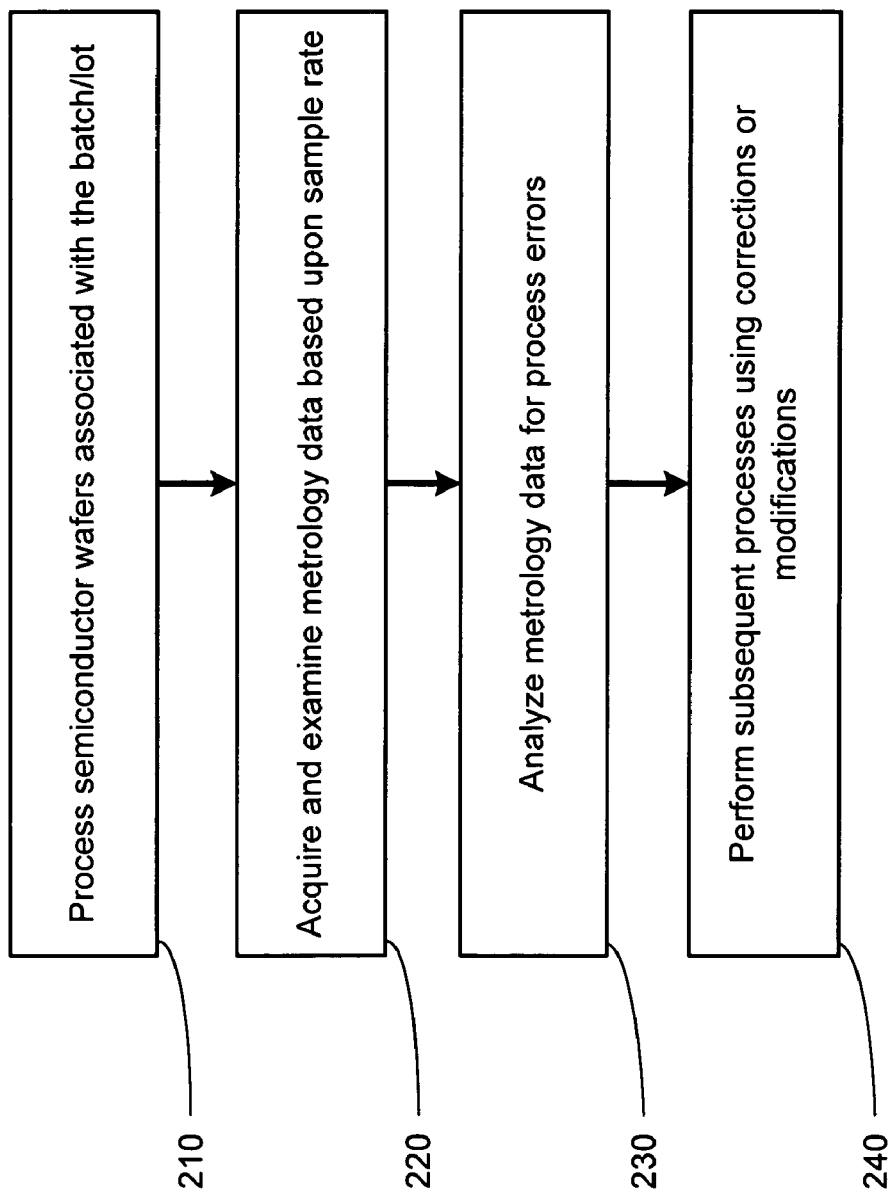
FIG. 2 illustrates a simplified flowchart depiction of a prior art process flow during manufacturing of semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes involved in semiconductor manufacturing. Many times, workpieces (e.g., semiconductor wafers 105, semiconductor devices, etc.) are stepped through multiple manufacturing process tools. Embodiments of the present invention provide for populating data sets reflecting metrology data from processed semiconductor wafers 105. Acquired sampled metrology data may be enhanced using extrapolation methods that implement data from one or more process-related models to adequately organize and populate data sets for efficient analysis of metrology data.

Furthermore, certain processes may be analyzed with coarser data (i.e., data sampled with less granularity) than what is available from sampled metrology data. In other words, the sampling of metrology data may provide too much data where a reverse interpolation may be performed to more efficiently analyze metrology data. The sampled metrology data may be enhanced using extrapolation methods and organized in such a manner that efficient retrieval and analysis of such data may be performed. Additionally, a greater number of sampled metrology data points may be averaged together or calculated using one or more various interpolation techniques known to those skilled in the art having benefit of the present disclosure, to increase the coarseness of metrology data for proper analysis. Based upon certain processes to be analyzed, a granularity of data organization is determined to determine how coarse or fine-point a set of metrology should be. This determination may be made based upon the type of process that is to be analyzed. Such granularity is used to extrapolate or interpolate data so that it may be organized for efficient retrieval and analysis.

Figure 3:
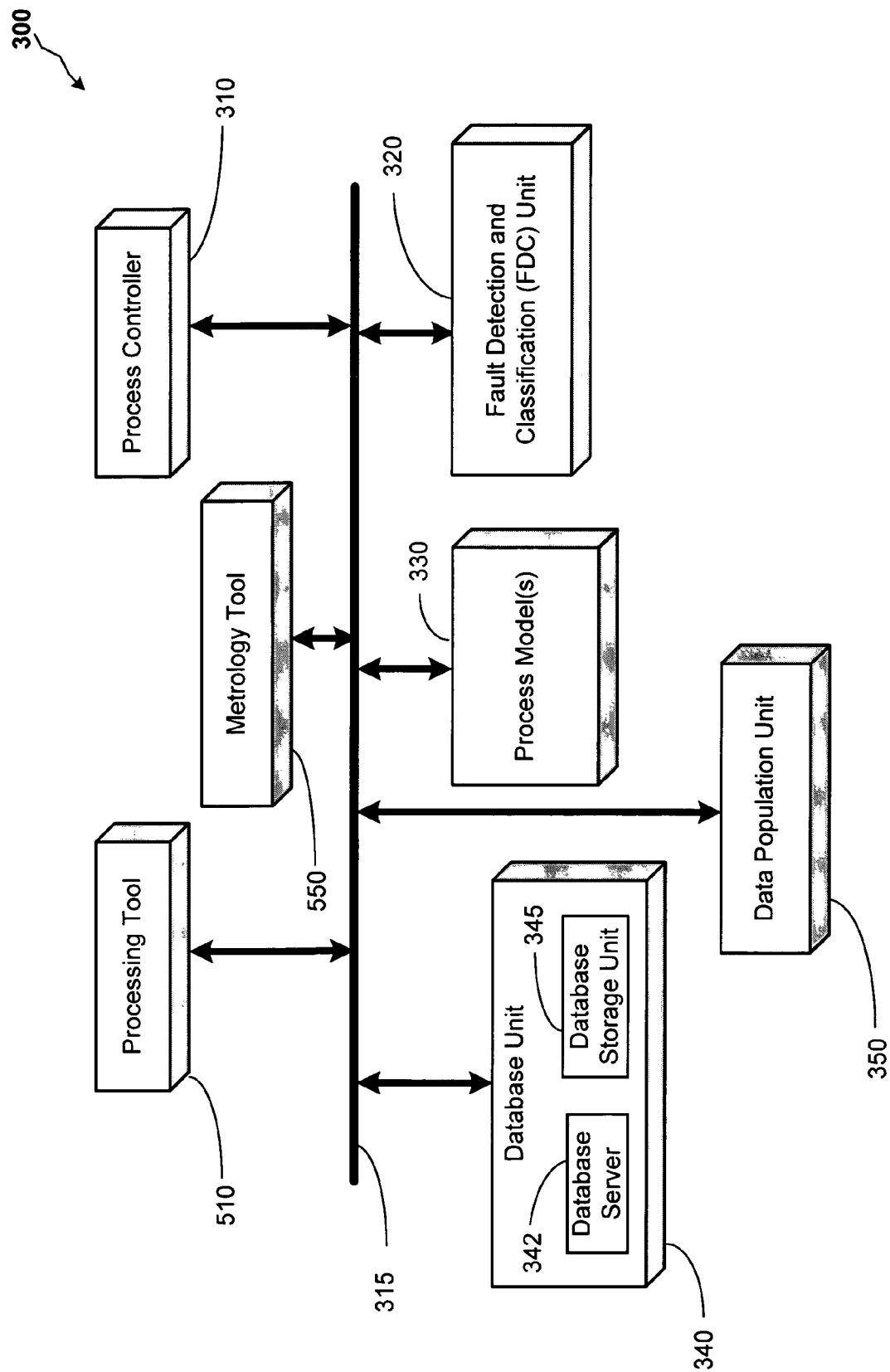
FIG. 3 provides a block diagram representation of a system in accordance with one illustrative embodiment of the present invention.

Turning now to FIG. 3, a block diagram depiction of a system 300 in accordance with embodiments of the present invention is illustrated. A process controller 310 in the system 300 is capable of controlling various operations relating to a processing tool 510. The system 300 is capable of acquiring manufacturing related data, such as metrology data related to processed semiconductor wafers 105, tool state data, and the like. The system 300 may comprise a metrology tool 550 to acquire metrology data related to the processed semiconductor wafers 105.

The system 300 may also comprise a database unit 340. The database unit 340 is provided for storing a plurality of types of data, such as manufacturing-related data, data related to the operation of the system 300 (e.g., the status of the processing tool 510, the status of semiconductor wafers 105, etc.). The database unit 340 may store metrology data, tool state data, such as tool state data relating to a plurality of process runs performed by the processing tool 510, and the like. The database unit 340 may comprise a database server 342 for storing tool state data and/or other manufacturing data related to processing semiconductor wafers 105 into a database storage unit 345.

The system 300 also comprises a fault detection and classification unit (FDC) 320 capable of performing various fault detection analyses relating to the processing of semiconductor wafers 105. The fault detection and classification unit 320 is capable of providing data relating to faults during processing of a semiconductor wafer 105. Fault detection analysis performed by the fault detection and classification unit 320 may include analysis of tool state data and/or metrology data. The FDC unit 320 may correlate particular tool state data to errors detected on the processed semiconductor wafer 105 by analyzing the metrology tool data. For example, particular errors, such as critical dimension errors discovered on the processed semiconductor wafers 105 may be correlated to particular gas flow rates or temperature data relating to tool state data. The fault detection performed by the FDC unit 320 may also include analyzing data from in situ sensors (not shown) integrated into the processing tools 510.

The system 300 may also comprise a set of process model(s) 330, which are capable of modeling the behavior of various processes and determining operation parameters to implement process steps. The process models 330 comprise a plurality of process models ($1^{st}$ through $N^{th}$ models shown in FIG. 4) that are capable of modeling and setting control parameters for a variety of process steps to be performed on the semiconductor wafers 105. The process model 330 is capable of acquiring and analyzing data to provide a prediction on probable outcomes based upon certain modeled process inputs. The probable outcomes may relate to conditions of a variety of features formed on the semiconductor wafers, such as thickness of deposited film, accuracy of etch processes, critical dimension measurements, and the like.

Data from process models 330 may be utilized to implement a data population process for populating and organizing metrology data. In other words, data from the process models 330 may be used to extrapolate additional data to organize and store metrology data. A data population unit 350 associated with the system 300 performs the process of populating certain data sets to enhance and organize metrology data for efficient look-up and utilization of the metrology data. Populating the metrology data may include adding extrapolated data to decrease the coarseness of the data in order to convert the data into more fine-point data as if the data were acquired using a higher granular process. In other words, data is populated to appear as though metrology data was acquired from substantially all processed wafers 105 in a batch. This process provides for more fine-point data for more accurate analysis of metrology data, which may be desirable for controlling certain processes performed on the semiconductor wafers 105.

The data population unit 350 may also be capable of depopulating certain data sets to increase the coarseness of the data to convert the data into a more coarse data set as if the data were acquired using a reduced granular process. This process may be performed to reduce the amount of data that is to be analyzed for more efficient processing, analysis, and/or utilization of the metrology data. Analysis of more coarse data may be acceptable when performing process control of certain process steps performed on semiconductor wafers 105, while analyzing a smaller amount of data generally increases process efficiency.

The data population unit 350 is capable of extrapolating data, such that a higher granularity of metrology data may be generated and stored and/or used in the present invention. The data population unit 350 is capable of organizing and storing data using a variety of granularity to provide for efficient process correction of processes performed by the system 300. A more detailed description of the data population unit 350 is provided in FIG. 4 and accompanying description below.

The process controller 310, the FDC unit 320, the process models 330, and/or the data population unit 350 may be software, hardware, or firmware units that are standalone units or may be integrated into a computer system associated with the system 300. Furthermore, the various components represented by the blocks illustrated in FIG. 3 may communicate with one another via a system communications line 315. The system communications line 315 may be a computer bus link, a dedicated hardware communications link, a telephone system communications link, a wireless communications link, or other communication links that may be implemented by those skilled in the art having benefit of the present disclosure.

Figure 4:
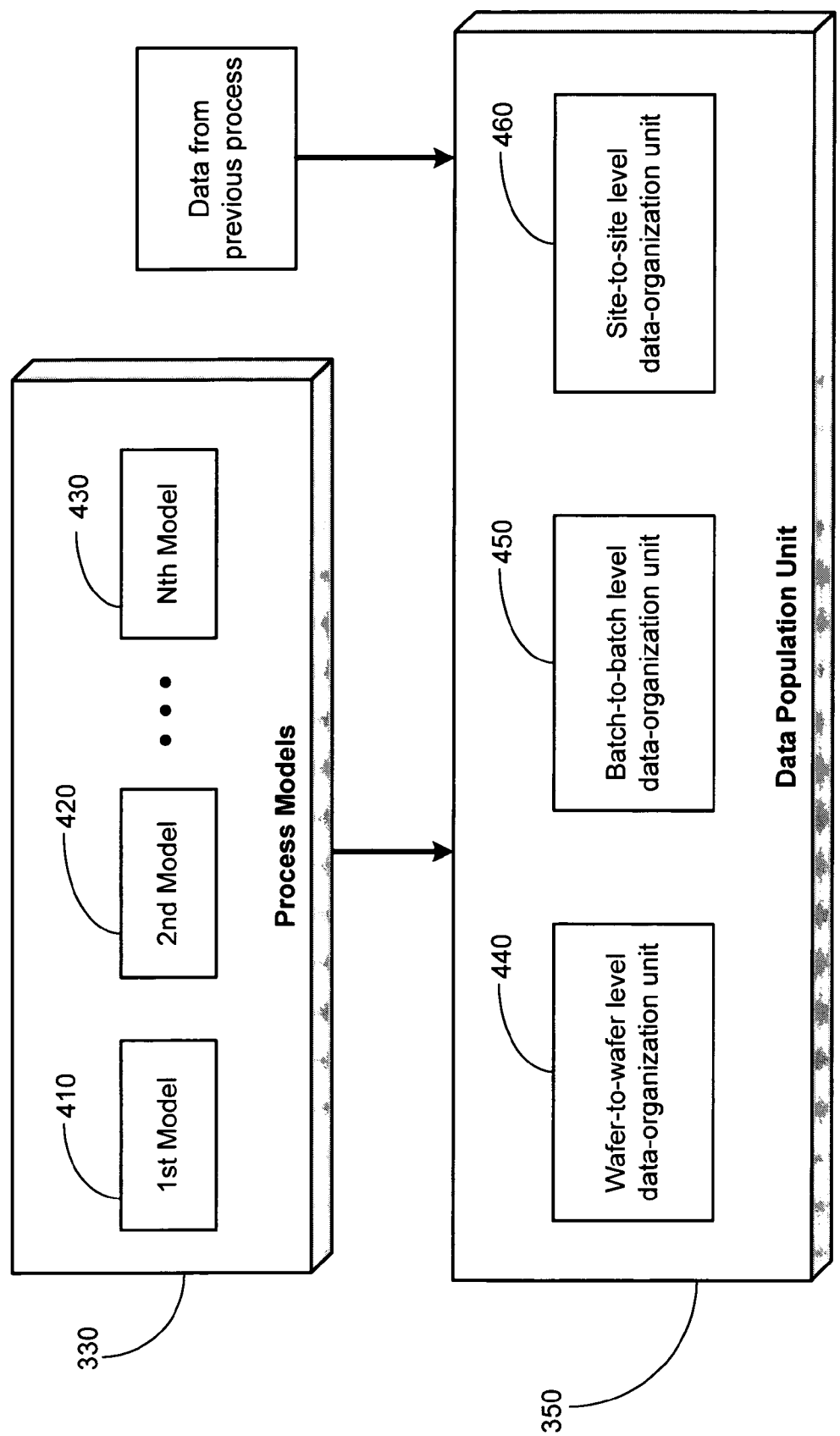
FIG. 4 illustrates a more detailed block diagram representation of a data population unit of FIG. 3, in accordance with one illustrative embodiment of the present invention.

Turning now to FIG. 4, a more detailed block diagram depiction of the process models 330 and the data population unit 350 is illustrated. The process models 330 may comprise a $1^{st}$ process model 410, a $2^{nd}$ process model 420 through an $N^{th}$ process model 430. The $1^{st}$ model through the $N^{th}$ process models 410–430 perform process prediction that may take into account the types of metrology data analyzed for utilization in performing control process adjustments. For example, the $1^{st}$ process model 410 may be a process model 330 that illustrates how the thickness of a deposited oxide layer varies over the length of a furnace. Wherein the second process model 420, for example, may model the cross-wafer uniformity layering related to that process. The cross-wafer uniformity data may be used by the second process model 420 to generate fine-point model data that provides information that has details relating to individual sites.

The process model 330 is capable of matching extrapolated prediction data relating to an average thickness across a wafer 105 that is controlled by the process model 330. Data from the process model 330 is sent to the data population unit 350. Additionally, data from previous processes, which may be stored in the database unit 340, is received by the data population unit 350. Data from the $1^{st}$ through $N^{th}$ process models 410–430, and the data from the previous process is sent to the data population unit 350. The data population unit 350 receives data from the process models 330 and/or data from previous processes.

The data population unit 350 may comprise a wafer-to-wafer level data-organization unit 440, a batch-to-batch level data organization unit 450, and/or a site-to-site level data organization unit 460. The wafer-to-wafer level data-organization unit 440 is capable of expanding sampled/acquired metrology data by extrapolating data from the acquired metrology data to provide a data set that may reflect representative metrology data for substantially all of the processed semiconductor wafers 105. One or more of a number of methods known by those skilled in the art having benefit of the present disclosure may be used to extrapolate data from acquired metrology data to provide representative data relating to processed wafers 105 that were not examined using a metrology tool 550. The representative data relating to non-examined wafers 105 may be interleaved with the acquired metrology data. Using such extrapolation and organization, a set of metrology data based upon a wafer-to-wafer granularity is produced for efficient analysis of the process operation.

The batch-to-batch level data organization unit 450 may organize metrology data based upon a batch-to-batch metrology data arrangement for later retrieval. The batch-to-batch level data-organization unit 450 organizes data in a lot-to-lot or a batch-to-batch level. Therefore, if metrology data with a higher than required granularity is available, the system 300 may perform a calculation adjustment based upon the acquired sampled metrology data. Mathematical calculations such as averaging certain groups of data may be performed to organize acquired metrology data into more coarse, batch-to-batch data with larger granularity. For example, for analysis of a nitride strip operation, substantially all of the wafers 105 in a batch are exposed to the same amount of chemicals. Site level or wafer level granularity information is less desirable and a granularity of batch-to-batch information is more useful to perform metrology analysis and control adjustment analysis.

The site-to-site level data organization unit 460 is capable of organizing data on a site-to-site (i.e., data from different locations or sites on a wafer 105) basis within a semiconductor wafer 105. Therefore, if all relevant sites on a semiconductor wafer 105 are not analyzed, the sampled metrology data may be extrapolated to generate representative data relating to non-sampled sites/regions on the wafer 105. Therefore, cross-wafer uniformity, for example, may be analyzed to see if proper processing is being performed across a plurality of semiconductor wafers 105. The data population unit 350 is capable of storing a plurality of levels of extraction of metrology data such that a wide range of process control analysis may be performed.

Figure 5:
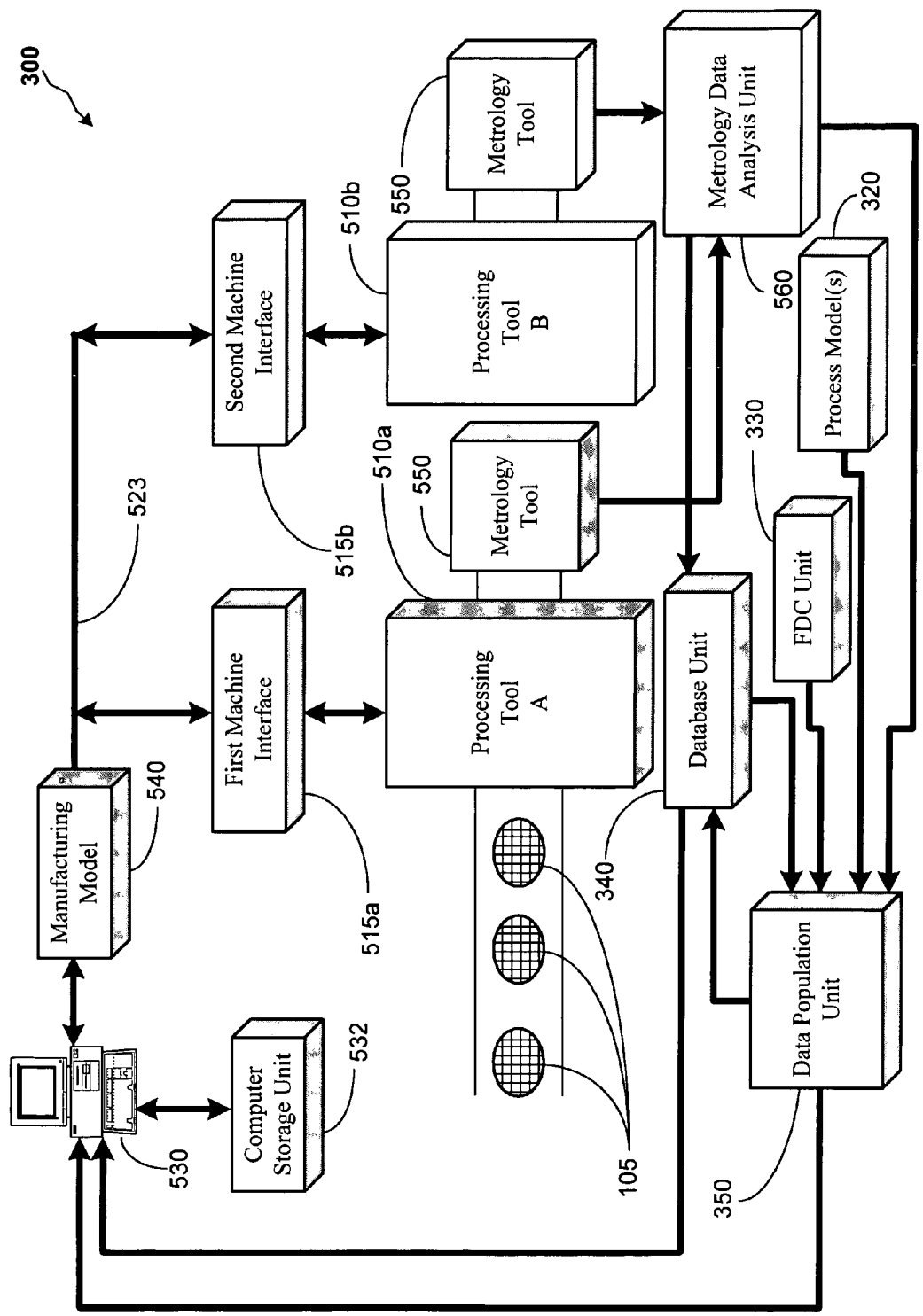
FIG. 5 illustrates a more detailed block diagram representation of the system shown in FIG. 3, in accordance with one illustrative embodiment of the present invention.

Turning now to FIG. 5, a more detailed block diagram of the system 300 in accordance with one embodiment of the present invention is illustrated. Semiconductor wafers 105 are processed on processing tools 510a, 510b using a plurality of control input signals, or manufacturing parameters, provided via a line or network 523. The control input signals, or manufacturing parameters, on the line 523 are sent to the processing tools 510a, 510b from a computer system 530 via machine interfaces 515a, 515b. The first and second machine interfaces 515a, 515b are generally located external the processing tools 510a, 510b. In an alternative embodiment, the first and second machine interfaces 515a, 515b are located within the processing tools 510a, 510b. The semiconductor wafers 105 are provided to and carried from a plurality of processing tools 510. In one embodiment, semiconductor wafers 105 may be provided to a processing tool 510 manually. In an alternative embodiment, semiconductor wafers 105 may be provided to a processing tool 510 in an automatic fashion (e.g., robotic movement of semiconductor wafers 105). In one embodiment, a plurality of semiconductor wafers 105 is transported in lots (e.g., stacked in cassettes) to the processing tools 510.

In one embodiment, the computer system 530 sends control input signals, or manufacturing parameters, on the line 523 to the first and second machine interfaces 515a, 515b. The computer system 530 is capable of controlling processing operations. In one embodiment, the computer system 530 is a process controller. The computer system 530 is coupled to a computer storage unit 532 that may contain a plurality of software programs and data sets. The computer system 530 may contain one or more processors (not shown) that are capable of performing the operations described herein. The computer system 530 employs a manufacturing model 540 to generate control input signals on the line 523. In one embodiment, the manufacturing model 540 contains a manufacturing recipe that determines a plurality of control input parameters that are sent on the line 523 to the processing tools 510a, 510b.

In one embodiment, the manufacturing model 540 defines a process script and input control that implement a particular manufacturing process. The control input signals (or control input parameters) on the line 523 that are intended for processing tool A 510a are received and processed by the first machine interface 515a. The control input signals on the line 523 that are intended for processing tool B 510b are received and processed by the second machine interface 515b. Examples of the processing tools 510a, 510b used in semiconductor manufacturing processes are steppers, etch process tools, deposition tools, and the like.

One or more of the semiconductor wafers 105 that are processed by the processing tools 510a, 510b can also be sent to a metrology tool 550 for acquisition of metrology data. The metrology tool 550 may be a scatterometry data acquisition tool, an overlay-error measurement tool, a critical dimension measurement tool, and the like. In one embodiment, a metrology tool 550 examines one or more processed semiconductor wafers 105. The metrology data analysis unit 560 may collect, organize, and analyze data from the metrology tool 550. The metrology data is directed to a variety of physical or electrical characteristics of the devices formed across the semiconductor wafers 105. For example, metrology data may be obtained as to line width measurements, depth of trenches, sidewall angles, thickness, resistance, and the like. Metrology data may be used to determine faults that may be present across the processed semiconductor wafers 105, which may be used to quantify the performance of the processing tools 510.

Data from the metrology data analysis unit 560 may be stored in the database unit 340 for later use for extrapolating and/or interpolating metrology data. The process model 330 and data from the database unit 340 may be used by the data population unit 350 to generate populated data and to organize and store such data at a variety of levels of extraction. The organized metrology data may be sent directly to the computer system 530 for analysis and implementation of changes based upon such analysis. Alternatively, the data population unit 350 may store populated sets of data into the database unit 340 for later retrieval. Therefore, the computer system 530 can extract populated data from the database unit 340 to analyze performance of particular process operations performed by the processing tools 510.

Figure 6:
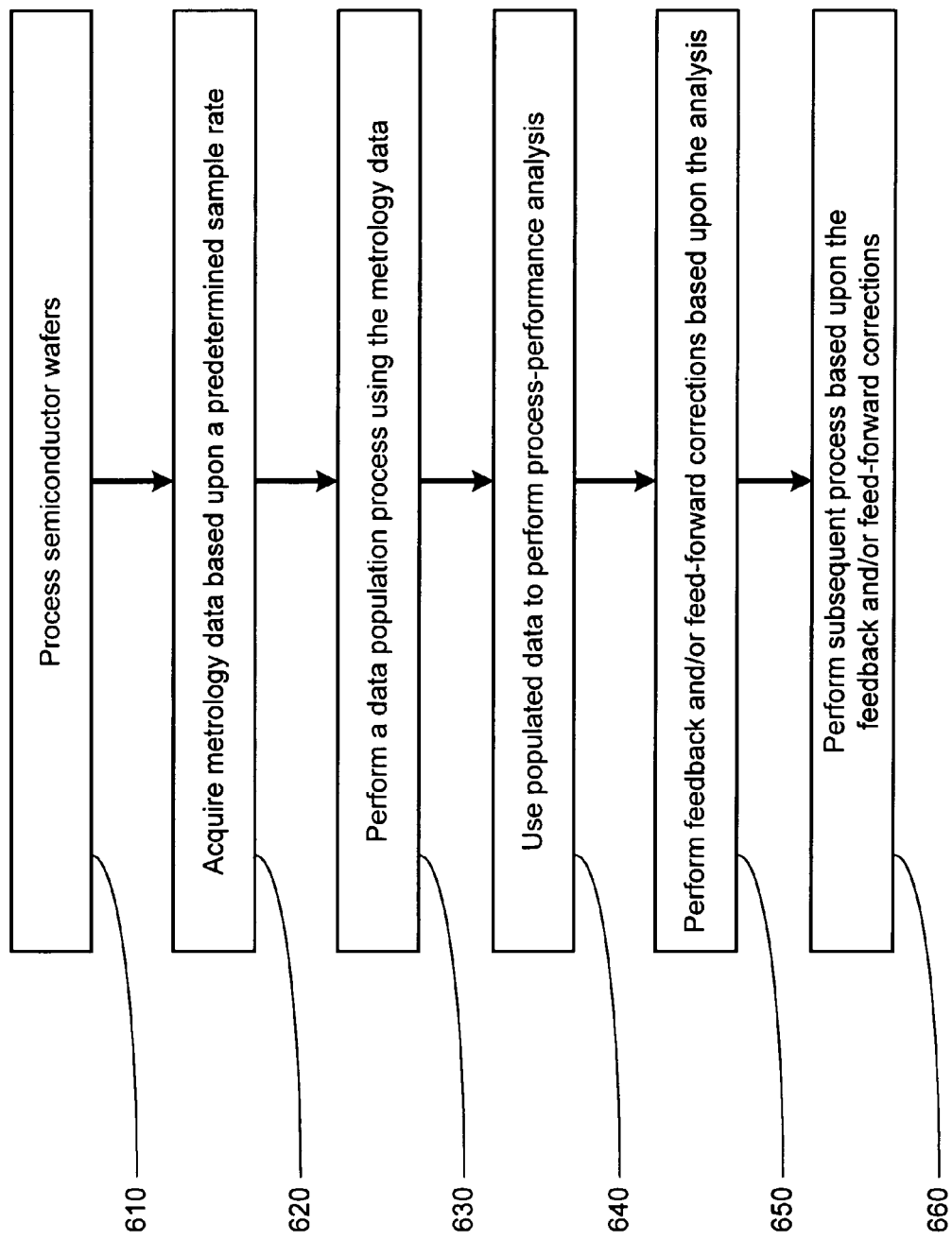
FIG. 6 illustrates a flowchart depiction of a method in accordance with one illustrative embodiment of the present invention.

Turning now to FIG. 6, a flow chart depiction of embodiments of the present invention is illustrated. The system 300 may perform processes on a plurality of wafers 105 relating to a batch/lot (block 610). Predetermined sample rates (i.e., a rate at which wafers 105 in a batch are selected for metrology analysis) are used to select particular wafers 105 for acquisition of metrology data (block 620). The system 300 may then perform a data population process (block 630). The data population process provides for organizing and making available extrapolated and/or interpolated metrology data such that more accurate and/or efficient analysis of process steps may be performed by the system 300. A more detailed description of the step of performing the data population process indicated in block 630 of FIG. 6 and accompanying description is provided below.

The populated and organized data may then be used by the system 300 to perform process-performance analysis relating to the process operations performed on the semiconductor wafers 105 (block 640). The process-performance analysis includes determining the accuracy of the processes performed on the wafers 105 and calculating adjustments to be made upon control parameters for feedback corrections and/or feed-forward compensation. Upon analyzing the process performance, feedback and/or feed forward corrections may be made based upon the analysis utilizing the calculated adjustments (block 650). The system 300 may perform subsequent processes on the semiconductor wafers 105 based upon the feedback and/or feed-forward adjustments (block 660).

Figure 7:
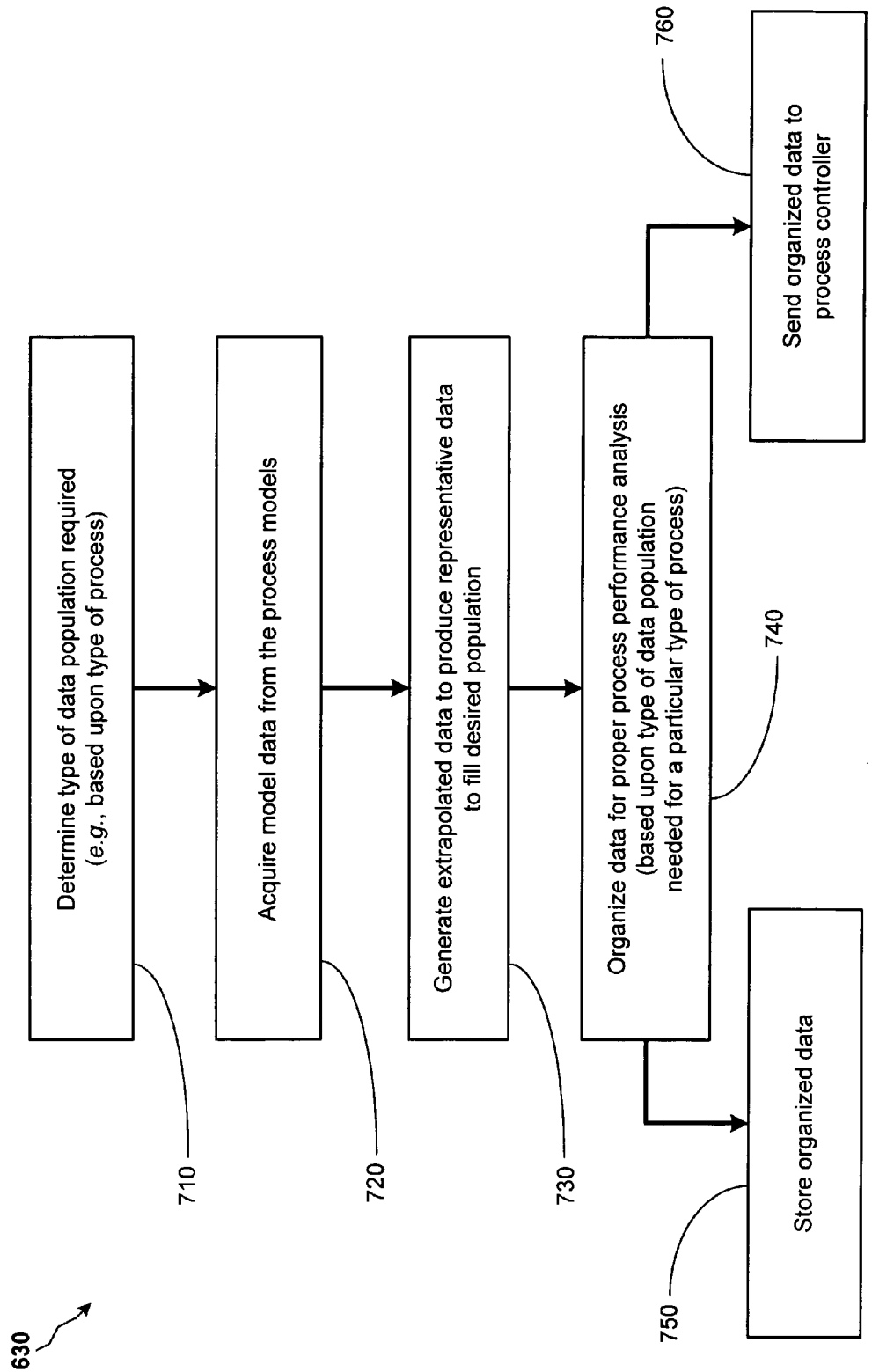
FIG. 7 illustrates a more detailed flowchart depiction of a method of performing a data population process of FIG. 6, in accordance with one illustrative embodiment of the present invention.

Turning now to FIG. 7, a more detailed flow chart depiction of the step of performing the data population process indicated in block 630 is illustrated. The system 300 may determine the type of data population required based upon particular types of processes to be performed on the semiconductor wafers 105 (block 710). For example, during certain processes, such as some stepper manufacturing processes, a wafer-to-wafer type granularity may be desirable when analyzing metrology data. A plurality of extraction levels that call for varying amounts of granularity may be used to organize data that is generated by extrapolating data to expand a set of acquired metrology data. For other types of processes, a reduced amount of granularity may be called for based upon particular levels of extraction for those processes, which results in interpolation of the acquired metrology data. Interpolation of acquired metrology data may result in a set of data that is representative of a larger amount of granularity, resulting in more coarse-point data.

The system 300 may also acquire modeling data, which may include data relating to predicted/projected results of processes yet to be implemented, from the process models 330 (block 720). Utilizing information relating to the type of data population required, modeling data, and the acquired metrology data from sampled wafers 105, the system 300 generates extrapolated data to generate data to fill the desired population (block 730). Conversely, the system 300 may interpolate acquired metrology data to create more coarse-point data to satisfy another data population requirement.

Modeling behavior of the various models 410–430 may be used to extrapolate data to populate a data set to generate more fine-point representative metrology data. Furthermore, in order to provide a high level of extraction such as lot-to-lot granularity, certain sampled metrology data are combined together using an averaging function and/or other mathematical techniques, to organize representative metrology data in such larger granularity fashion. The system 300 then organizes the expanded or contracted metrology data (i.e., fine-point representative data for certain processes and coarse-point representative data for other processes) based upon the type of data population needed for the particular type of process being analyzed (block 740). Once the data is organized, it may be stored for later retrieval (block 750). Alternatively, the organized data may be sent to the process controller 310 for adjustments to processes being performed on the semiconductor wafers 105.

Utilizing embodiments of the present invention, sample metrology data is acquired from processed semiconductor wafers 105 and such data is extrapolated or interpolated to provide representative data based upon a predetermined level of granularity, such that efficient access of metrology data may be used to perform timely and accurate feedback/feed-forward corrections. Specifically, embodiments of the present invention provide for organizing data in a wafer-to-wafer granularity, a site-to-site granularity, and/or batch-to-batch granularity, which may be retrieved efficiently to perform accurate and efficient analysis of metrology data for process control. Utilizing embodiments of the present invention, more accurately and efficiently processed semiconductor wafers 105 may be produced.

The principles taught by the present invention can be implemented in an Advanced Process Control (APC) Framework, such as a Catalyst system offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   processing a first and a second workpiece;
   acquiring metrology data relating to said first workpiece; and
   extrapolating said metrology data to generate representative metrology data relating to said second workpiece.

2. The method of claim 1, wherein processing said workpiece further comprises processing a semiconductor wafer.

3. The method of claim 1, further comprising:
   acquiring metrology data relating to said second workpiece;
   interpolating said metrology data relating to said first and said second workpieces to generate a representative metrology data relating to one of said first and second workpieces.

4. The method of claim 3, wherein interpolating said metrology data further comprises increasing a granularity of said metrology data.

5. The method of claim 1, wherein processing said first and second workpieces further comprises processing said first and second workpieces in a batch.

6. The method of claim 1, wherein acquiring metrology data relating to said first workpiece further comprises acquiring metrology data based upon a sample rate.

7. The method of claim 1, wherein extrapolating said metrology data further comprises decreasing a granularity of said metrology data.

8. The method of claim 1, further comprises organizing said representative metrology data for analysis for process control.

9. The method of claim 8, further comprises storing said organized metrology data for analysis for process control.

10. The method of claim 1, wherein extrapolating said metrology data to generate representative metrology data relating to said second workpiece further comprises estimating said metrology data results relating to said second workpiece based upon said acquired metrology data relating to said first workpiece.

11. The method of claim 1, wherein extrapolating said metrology data to generate representative metrology data relating to said second workpiece further comprises extrapolating said metrology data on a batch-to-batch basis.

12. The method of claim 1, wherein extrapolating said metrology data to generate representative metrology data relating to said second workpiece further comprises extrapolating said metrology data on a workpiece-to-workpiece basis.

13. The method of claim 1, wherein extrapolating said metrology data to generate representative metrology data relating to said second workpiece further comprises extrapolating said metrology data on a site-to-site basis.

14. A method, comprising:
    processing a plurality of workpieces associated with a batch;
    acquiring metrology data relating to at least one workpiece based upon a sample rate; and
    extrapolating said metrology data to generate representative metrology data relating to at least one non-sampled workpiece associated with said batch.

15. The method of claim 14, wherein processing said workpiece further comprises processing a semiconductor wafer.

16. A method, comprising:
    processing a plurality of workpieces associated with a batch;
    sampling a plurality of said workpieces for acquiring metrology data relating to sampled workpieces based upon a sample rate; and
    performing at least one of an extrapolation process and an interpolation process upon said metrology data, wherein said extrapolation process comprising extrapolating said metrology data to generate representative metrology data relating to at least one non-sampled workpiece associated with said batch, and wherein said interpolation process comprising interpolating said metrology data relating to said sampled workpieces for contracting said metrology data.

17. An apparatus, comprising:
    means for processing a first and a second workpiece;
    means for acquiring metrology data relating to said first workpiece; and
    means for extrapolating said metrology data to generate representative metrology data relating to said second workpiece.

18. A system, comprising:
    a processing tool to process a first and a second workpiece;
    a metrology tool to acquire metrology data relating to said first workpiece; and
    a controller to perform at least one of an extrapolation process and an interpolation process upon said metrology data, wherein said extrapolation process comprising extrapolating said metrology data relating to said first workpiece to generate representative metrology data relating to said second workpiece, and wherein said interpolation process comprising interpolating said metrology data relating to said first workpieces for contracting said metrology data.

19. The system of claim 18, wherein said workpiece is a semiconductor wafer.

20. The system of claim 18, further comprising:
    a database unit to store said representative metrology data;
    a process model to model a predicted metrology data;
    a fault detection unit to calculate a fault data based upon said processing of said first and second workpieces; and
    a data population unit to perform at least one of said extrapolation process and said interpolation process based upon at least one of said predicted metrology data, acquired metrology data, and said fault data.

21. An apparatus, comprising:
    a controller to perform at least one of an extrapolation process and an interpolation process upon metrology data acquired from at least one sampled workpiece, wherein said extrapolation process comprising extrapolating said metrology data relating to said sampled workpiece to generate representative metrology data relating to a non-sampled workpiece, and wherein said interpolation process comprising interpolating said metrology data relating to said sampled workpiece to contract said metrology data.

22. The apparatus of claim 21, wherein said workpiece is a semiconductor wafer.

23. The apparatus of claim 21, further comprising:
a database unit to store said representative metrology data;
a process model to model a predicted metrology data;
a fault detection unit to calculate a fault data based upon said processing of said first and second workpieces; and
a data population unit to perform at least one of said extrapolation process and said interpolation process based upon at least one of said predicted metrology data, acquired metrology data, and said fault data.

24. A computer readable program storage device encoded with instructions that, when executed by a computer, performs a method, comprising:
processing a first and a second workpiece;
acquiring metrology data relating to said first workpiece; and
extrapolating said metrology data to generate representative metrology data relating to said second workpiece.

25. The computer readable program storage device encoded with instructions that, when executed by a computer, performs the computer readable program storage device encoded with instructions that, when executed by a computer, performs the method of claim 24, wherein processing said workpiece further comprises processing a semiconductor wafer.

26. The computer readable program storage device encoded with instructions that, when executed by a computer, performs the method of claim 24, further comprising:
acquiring metrology data relating to said second workpiece;
interpolating said metrology data relating to said first and said second workpieces to generate a representative metrology data relating to one of said first and second workpieces.

27. The computer readable program storage device encoded with instructions that, when executed by a computer, performs the method of claim 26, wherein interpolating said metrology data further comprises increasing a granularity of said metrology data.

28. The computer readable program storage device encoded with instructions that, when executed by a computer, performs the method of claim 24, wherein processing said first and second workpieces further comprises processing said first and second workpieces in a batch.

29. The computer readable program storage device encoded with instructions that, when executed by a computer, performs the method of claim 24, wherein acquiring metrology data relating to said first workpiece further comprises acquiring metrology data based upon a sample rate.

30. The computer readable program storage device encoded with instructions that, when executed by a computer, performs the method of claim 24, wherein extrapolating said metrology data further comprises decreasing a granularity of said metrology data.

31. The computer readable program storage device encoded with instructions that, when executed by a computer, performs the method of claim 24, further comprises organizing said representative metrology data for analysis for process control.

32. The computer readable program storage device encoded with instructions that, when executed by a computer, performs the method of claim 31, further comprises storing said organized metrology data for analysis for process control.

33. The computer readable program storage device encoded with instructions that, when executed by a computer, performs the method of claim 24, wherein extrapolating said metrology data to generate representative metrology data relating to said second workpiece further comprises estimating said metrology results relating to said second workpiece based upon said acquired metrology data relating to said first workpiece.

34. The computer readable program storage device encoded with instructions that, when executed by a computer, performs the method of claim 24, wherein extrapolating said metrology data to generate representative metrology data relating to said second workpiece further comprises extrapolating said metrology data on a batch-to-batch basis.

35. The computer readable program storage device encoded with instructions that, when executed by a computer, performs the method of claim 24, wherein extrapolating said metrology data to generate representative metrology data relating to said second workpiece further comprises extrapolating said metrology data on a workpiece-to-workpiece basis.

36. The computer readable program storage device encoded with instructions that, when executed by a computer, performs the method of claim 24, wherein extrapolating said metrology data to generate representative metrology data relating to said second workpiece further comprises extrapolating said metrology data on a site-to-site basis.

37. A method, comprising:
acquiring metrology data relating to a first processed workpiece; and
determining representative metrology data relating to a second processed workpiece based upon said metrology data relating to said first processed workpiece, wherein determining said representative metrology data comprises estimating a value for said representative metrology data based upon a first value and a second value, wherein said first value relates to said metrology data relating to said first processed workpiece, and said second value relates to a known metrology value.

38. The method of claim 37, further comprising:
acquiring metrology data relating to said second workpiece;
interpolating said metrology data relating to said first and said second workpieces to generate a representative metrology data relating to one of said first and second workpieces.

* * * * *